H. K. AUSTIN.
TIRE INFLATING PUMP.
APPLICATION FILED JULY 13, 1911.

1,045,495.

Patented Nov. 26, 1912.

Witnesses:
H. L. Allen
F. R. Poulston

Inventor:
Henry K. Austin
by Wright Brown Quinby Macy
attys.

UNITED STATES PATENT OFFICE.

HENRY K. AUSTIN, OF READING, MASSACHUSETTS.

TIRE-INFLATING PUMP.

1,045,495.

Specification of Letters Patent. Patented Nov. 26, 1912.

Application filed July 13, 1911. Serial No. 638,275.

*To all whom it may concern:*

Be it known that I, HENRY K. AUSTIN, a citizen of the United States, and resident of Reading, in the county of Middlesex and State of Massachusetts, have invented certain new and useful Improvements in Tire-Inflating Pumps, of which the following is a specification.

This invention relates to pumps for inflating pneumatic tires and it has for its object first to provide improved means for controlling the admission of air to the pump and its discharge therefrom; secondly, to provide a pump adapted to be conveniently and effectively controlled by the operator; and, thirdly, to provide improved means for coupling the pump to tire valves of different makes.

The invention consists in the improvements which I will now proceed to describe and claim.

Figure 1:
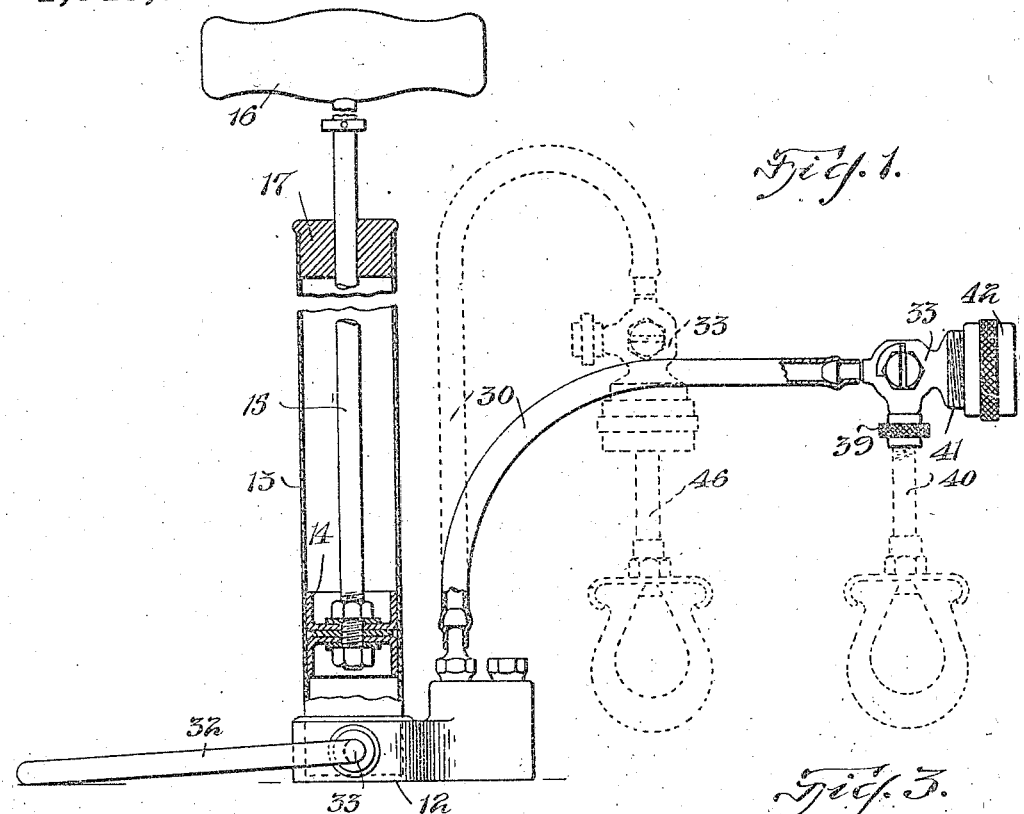
Figures 2, 3:
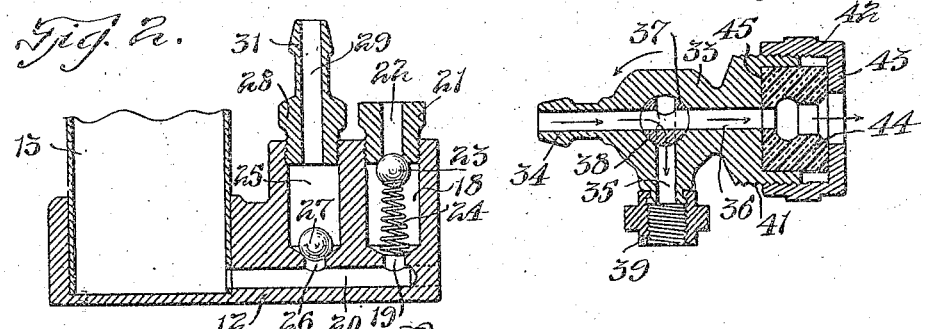
Figure 4:
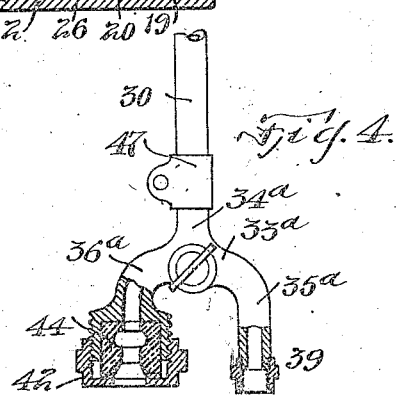

Of the accompanying drawings forming a part of this specification,—Figure 1 represents a side elevation of a pump embodying my invention, parts being shown in section. Fig. 2 represents a sectional view of the lower or base portion of the pump. Fig. 3 represents a sectional view of the terminal hereinafter described, which engages the tire valves. Fig. 4 represents a side elevation of a modified form of said terminal shown partly in section.

The same reference characters indicate the same or similar parts in all the figures.

In the drawings,—12 represents a horizontally elongated base which preferably has a flat bottom adapted to rest on a floor or other horizontal support beside a wheel having a tire to be inflated.

13 represents a pump cylinder attached to one end portion of the base and provided with a piston 14 operated by a rod 15 having a handle 16, the latter passing through a head 17 attached to the outer end of the cylinder. The opposite end portion of the base 12 is provided with an air inlet which includes a valve chamber 18, a contracted passage 19 connecting said chamber with a passage 20 communicating with the inner end of the pump cylinder, and a bushing 21 having a contracted inlet passage 22, the inner end of which is formed as a seat for a ball valve 23. Said valve is yieldingly closed by a spring 24 and is adapted to permit the entrance of air through the air inlet and prevent the egress of air therethrough.

Beside the air inlet is an air outlet which includes a valve chamber 25 connected by a contracted passage 26 with the passage 20, the inner end of said passage 26 forming a seat for a ball valve 27 and a bushing 28 having a contracted passage 29 and formed at its outer portion as a nipple adapted to be inserted in a flexible tube 30 and provided with a shoulder 31 which engages the tube as indicated by Fig. 1. The valve 27 is yieldingly closed, preferably by gravity, to prevent admission of air to the pump cylinder through the air outlet, and is adapted to open to permit the egress of air through said outlet.

32 represents a foot rest pivoted at 33 to the base and adapted to project therefrom at one side of the cylinder 13, the portion of the base containing the air inlet and air outlet projecting from the opposite side of the cylinder. When the pump is in use, the flat bottom of the elongated base, and the foot rest 32 projecting therefrom, enable the operator to firmly hold the pump while manipulating the piston.

33 represents a terminal engaged with the outer end of the flexible tube 30, said terminal having an air inlet 34 preferably formed as a shouldered nipple, as shown by Figs. 1 and 3, adapted to enter the tube 30. The said terminal is provided with two air outlets 35 and 36 extending in different directions from a plug chamber 37 in which is located a rotary two-way valve plug 38 formed as shown by Fig. 3 to connect the air inlet 34 with either of the air outlets, the form of the valve plug being such that when either outlet is connected with the inlet, the other outlet is closed.

The outlet 35 is provided with a coupling member 39 formed as an internally threaded nut rotatable without endwise movement on the outlet 35 and internally screw-threaded to engage an external thread on a tire valve 40.

The outlet 36 is enlarged and is provided with an external screw thread 41 adapted to engage an internal thread in a flanged coupling nut 42, the flange 43 of which bears on a rubber socket 44 and holds said socket in a recess 45 formed in the outer end of the outlet 36. The socket 44 is adapted to receive the outer end of a tire valve 46, said outer end having a smooth external surface instead of being screw-threaded like the valve 40. The valve 46, when inserted in the socket 44, enlarges the orifice therein and causes the socket to form an air-tight joint around the valve.

It will be seen from the foregoing that the terminal 33, flexibly connected with the pump, is adapted to be used interchangeably with different makes of tire valves.

Fig. 4 shows a modified form of the terminal, above described, said figure showing a terminal 33ª having an air inlet 34ª adapted to be connected by a clamp 47 with the tube 30, the air outlets 35ª and 36ª being curved so that their outer portions extend in the same direction.

I claim:—

1. A tire inflating pump comprising a horizontally elongated base having a pump cylinder connected to one end portion, the other end portion having a horizontal passage communicating with the pump cylinder, and having also two vertical air chambers communicating with the horizontal passage, said chambers and passage being in the same vertical plane, said air chambers being provided with valve seats, valves in said chambers to coöperate with said seats, and a piston in said cylinder.

2. A tire inflating pump comprising a horizontally elongated base having a pump cylinder connected to one end portion, the other end portion having a horizontal passage communicating with the pump cylinder, and having also two vertical air chambers communicating with the horizontal passage, said chambers and passage being in the same vertical plane, bushings fitted to the upper ends of said chambers, one of said bushings forming an air outlet and the other bushing forming an air inlet and presenting a valve seat at its inner end, a ball valve in the outlet chamber, a spring having a ball valve at its upper end located in the inlet chamber, and a piston in said cylinder.

In testimony whereof I have affixed my signature, in presence of two witnesses.

H. K. AUSTIN.

Witnesses:
C. F. BROWN,
P. W. PEZZETTI.